H. R. STRAIGHT.
BEARING AND METHOD FOR MAKING THE SAME.
APPLICATION FILED MAR. 31, 1919.

1,360,244.

Patented Nov. 23, 1920.

Inventor
H. R. Straight

UNITED STATES PATENT OFFICE.

HALVER R. STRAIGHT, OF ADEL, IOWA.

BEARING AND METHOD FOR MAKING THE SAME.

1,360,244.   Specification of Letters Patent.   Patented Nov. 23, 1920.

Application filed March 31, 1919. Serial No. 286,567.

*To all whom it may concern:*

Be it known that I, HALVER R. STRAIGHT, a citizen of the United States, residing at Adel, in the county of Dallas, State of Iowa, have invented Bearings and Methods for Making the Same, of which the following is the specification.

My invention pertains to the manufacture of bearings for watches, clocks and small machines requiring a bearing capable of standing a very large amount of wear without much attention or lubrication.

Bearings of this class are usually made of hardened steel or jewels and usually have to engage steel contact members or carry steel shafting. It is a well known fact that shafts and bearings made of the same material, wear very rapidly even if hardened, and especially if run without lubrication. For that reason, in watches and such mechanism, jewels are used and are well adapted for the purpose, as they are very hard and are of a very close grain and do not wear perceptibly, but jewels are scarce and are too small to be adapted to larger machines and are also hard to cut to the proper shape such as is required for a great many machines. They are also very expensive to produce.

The object of my invention is to produce bearings for watches, clocks, adding machines, etc., from a cheap and comparatively inexpensive material, and when so produced to have a very hard and smooth wearing surface.

A further object of my invention is a cheap and improved method of manufacturing or producing bearings for watches and small machinery capable of being easily and cheaply formed to any desired shape.

Referring to the drawings.

All of these figures are merely for the purpose of illustrating that bearings of different sizes and shapes may be easily produced according to my method as will hereinafter be described.

I have discovered that certain kinds of natural shale and clays possess the proper ingredients in the right proportion to make good bearings or jewels for watches or other small machines, when vitrified and when so produced have properties similar to those of the jewels.

In producing the bearing, I first select the proper material, preferably a red shale having a very close and fine grain, free from foreign substances or gritty materials. This shale is easily shaped and formed when mined, and can be cut very readily to any desired shape and does not have to be pulverized or pugged before burning.

Figure 3:
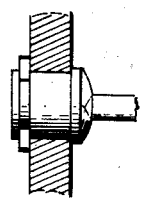
Fig. 3 shows a pivot bearing with a portion of the pivot in position.
Figure 4:
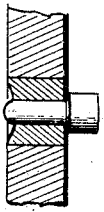
Fig. 4 is a sectional view of another form of a bearing mounted in a frame and showing a shaft in position.
Figure 5:
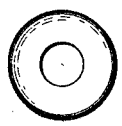
Fig. 5 is an end view of the bearing shown in Fig. 4.

In producing the bearings such as shown in Fig. 3, Fig. 4 and Fig. 5 of the drawings, I preferably cut a fresh shale into rectangular bars, after which they are dried to harden and toughen. After the bars have become sufficiently dried, they are placed in suitable machines for turning them to the desired shape.

It is to be understood, however, that the shale may be ground and mixed with water and molded to the desired shape, but I have found that natural shale is the best as it is somewhat condensed and the operations and manufacturing is simpler.

After the bearings have been turned to the desired shape, they are placed in a suitable kiln and heat is applied gradually until the temperature has reached a degree where vitrification will take place, after which the temperature will be lowered and the bearings are removed from the kilns. The time required for raising and lowering the temperature will vary some, depending on the nature of the shale and the degree of hardness required of the bearings. Shale is somewhat similar to iron in this respect, the faster it is cooled, the harder and brittler it gets and lowering the temperature slowly has a tendency to toughen it and produce a tight smooth grained surface. Bearings thus produced are homogeneous and have a hard and smooth surface and free from pits and possess a degree of hardness about equal to that of sapphire or ruby.

Figure 2:
Fig. 2 shows a perspective view of one form of a contact member.
Figure 1:
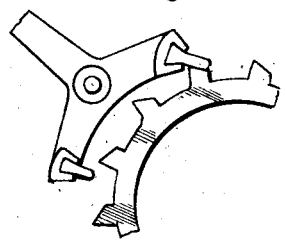
Figure 1 shows a portion of an escapement for a watch or clock showing one method of applying my improved bearings or contact members.

Bearing contact members such as are shown in Figs. 1 and 2 of the drawings, may be cut to the desired shape by any convenient method before they are placed in the kiln.

It is to be understood, however, that a large variety of the shapes and forms not shown in the drawings may be made without departing from the spirit of my invention. In certain kinds of shale it may be necessary to polish the bearings before they are burned.

It will thus be seen I have produced a method of easily and quickly making bearings or contact members from a cheap material sufficiently hard and close-grained to compare favorably with the jewel bearings and can be easily shaped and adapted to machinery of a wide scope.

I claim:

1. A method of making bearings and the like from shale, consisting first in cutting the natural shale to the desired shape of the bearing, then gradually heating to the point of vitrification, and then cooling.

2. A method of making bearings and the like from shale, which consists in drying at normal temperature, then cutting from the natural shale the desired shape of the bearing, then gradually heating until vitrification takes place, and then cooling.

3. A method of making bearings and the like from shale, which consists in mining natural shale into chunks, drying said chunks at a low temperature, then cutting the dried shale to the desired shape of the bearing, then gradually applying heat until vitrification takes place, and then gradually cooling.

4. A method of making bearings and the like from shale, which consists in drying the shale at a normal temperature, cutting for forming the natural shale to the desired shape of the bearing, polishing, then gradually applying heat until vitrification takes place, and then cooling.

H. R. STRAIGHT.